Aug. 21, 1956    R. C. WOOD ET AL    2,759,267
MEASURING AND COMPUTING DEVICE
Filed Dec. 16, 1952                    2 Sheets-Sheet 2

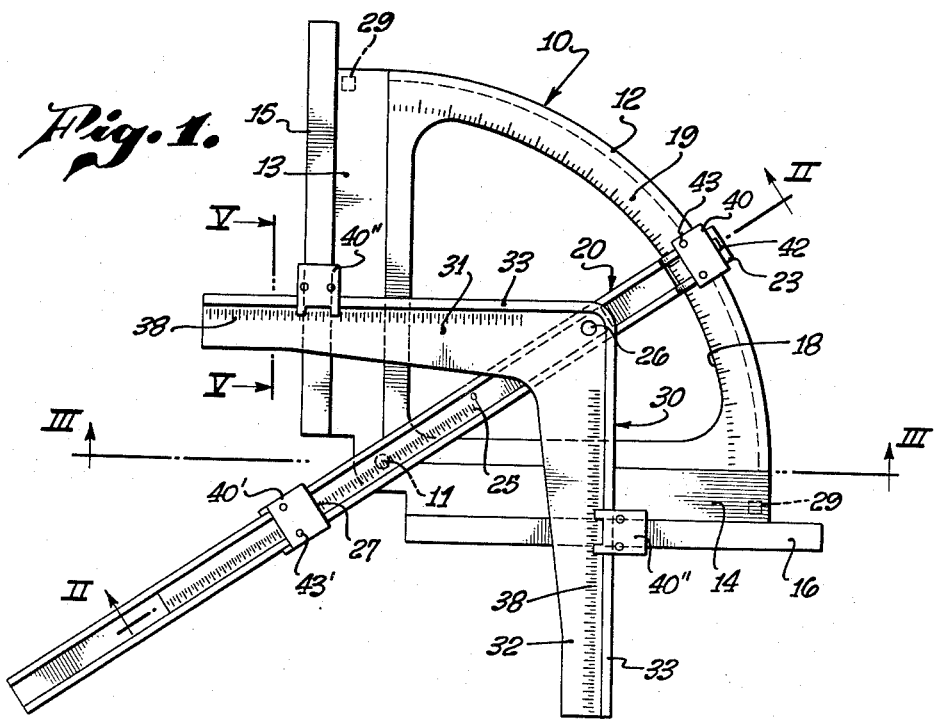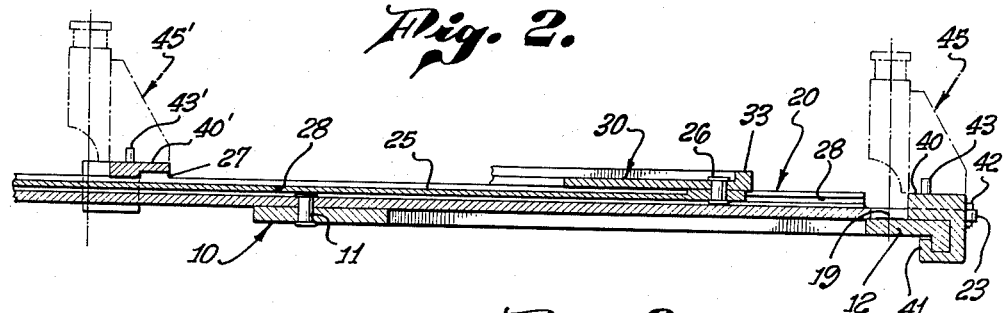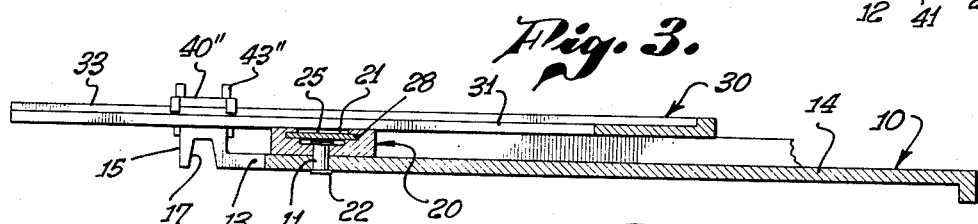

Rufus C. Wood,
Louise H. Wood,
INVENTORS.

BY

ATTORNEY.

United States Patent Office 2,759,267
Patented Aug. 21, 1956

2,759,267

MEASURING AND COMPUTING DEVICE

Rufus C. Wood and Louise H. Wood, Los Angeles, Calif.

Application December 16, 1952, Serial No. 326,274

2 Claims. (Cl. 33—76)

This invention pertains to a computing device whereby the position and ordinates of any point may be visually and directly determined, the computer also being adapted to rapidly, accurately and graphically provide answers to a great variety of problems, without the necessity of employing trigonometric functions or extensive calculations, provided the problem admits of a geometric layout.

A great variety of civil engineering and mechanical engineering problems involve computations which include the determination of distances between points, said points bearing a relationship to other points in terms of angular displacement, distance, etc. Forces are very often plotted and it is often necessary to obtain resultants graphically. Methods of obtaining the centers of gravity of irregularly shaped objects, areas of irregularly shaped plots, determination of points of intersection of lines drawn from predetermined points in known directions, etc. often involve complicated and prolonged mathematical computation.

The graphic computer of the present invention provides a tool whereby the angular position and coordinates of any point may be readily and accurately determined. The device permits a problem to be broken up into a number of right angle triangles whose altitude, sides and angles are readily obtained and a great variety of mathematical problems is thereby greatly simplified, not only in civil engineering work but also in mechanical engineering work involving stress-strain relationships, resultants, total determinations and elements necessary for the proper design and determination of functional characteristics of trusses, etc.

Generally stated, the present invention relates to a graphic computer consisting of a quadrant carrying indicia in degrees, a radial member pivotally connected to the quadrant at its center or point of origin, a calibrated scale slidable longitudinally along such radial member, such sliding scale including a station point, and a two-legged orienting member pivotally connected to the calibrated slide at the station point, the two legs being at right angles to each other. Means are then provided whereby the two legs of the orienting member are maintained at right angles to the radial margins of the quadrant and additional means are provided whereby an optical magnifying assembly may be used to accurately read the ordinate and abscissa of the station point at any angular position of the primary radial member. In addition, means are provided for visually and accurately reading the angular disposition of the radial member and station point. It will be immediately observed that this arrangement permits a point whose distance and angular direction is known to be immediately identified in terms of its horizontal and vertical coordinates without the necessity of recourse to logarithmic functions or trigonometric solutions.

It is an object of the present invention to disclose and provide a relatively simple and efficient, graphic, visually obserable computer.

A further object of the invention is to disclose and provide an arrangement of elements whereby the co-ordinates of any given station point may be quickly and accurately determined.

A still further object is to disclose and provide a graphical computer capable of being used in the resolution of a great variety of problems capable of geometric layout.

These and various other objects, uses, adaptations and modifications will become apparent to those skilled in the art from the following description of exemplary forms in which the invention may be embodied. In order to facilitate understanding, reference will be had to the appended drawings in which:

Fig. 1 is a plan view of one form of device.

Fig. 2 is an enlarged section taken along the plane II—II of Fig. 1.

Fig. 3 is a vertical section taken along III—III of Fig. 1.

Figure 4:
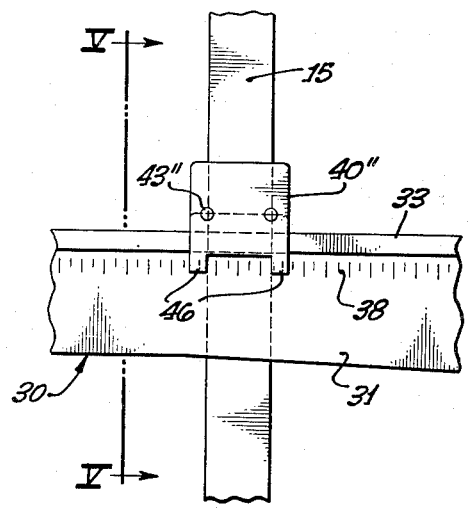
Fig. 4 is an enlarged plan view of a portion of the device.

The device of the present invention, in the form illustrated in the drawings, may comprise a quadrant member generally indicated at 10 including an origin point 11, a curved marginal edge 12, and wings 13 and 14 terminating in an ordinate guide 15 and an abscissa guide 16. As shown in Fig. 3, each of these guiding edges 15 and 16 may be in the form of a channel having a downwardly directed recess 17. The ordinate and abscissa guides 15 and 16 are at right angles to each other and when extended would intersect beyond the origin point 11.

A primary radial member 20 is pivotally connected to the quadrant 10 at the origin point 11 as indicated in Fig. 3. This radial member is preferably provided with an upwardly facing recess 21, the bottom of the recess being suitably bored so as to receive the bearing spindle or eyelet 22 by means of which the radial member is pivotally connected to the quadrant 10. One end of the radial member 20 is bifurcated and the furcations extend slightly beyond the curved edge 12 of the quadrant as indicated at 23. The other end may extend, beyond the origin point 11, a distance substantially equivalent to the radius of the quadrant.

The inner walls of recess 21 of the radial member 20 may be grooved so as to slidably receive a calibrated scale 25 (see Fig. 3). The outer end of this calibrated scale 25 is pivotally connected as indicated at 26 (Fig. 2) to a two-legged orienting member generally indicated at 30, the two legs being identified at 31 and at 32. In order to impart stiffness and for other reasons made apparent hereinafter, such two-legged member 30 may be provided with an upstanding reinforcing edge 33. The legs 31 and 32 should be sufficiently long to slidably rest upon the guides 15 and 16 in all positions of the station point (or pivot point) 26 within the quadrant.

Adjacent the curved margin 12 of the quadrant 10, indicia in degrees are carried by the quadrant and preferably such indicia run from zero degrees to 90 degrees in both directions and are graduated as accurately and as finely as possible in 2 minute or 10 minute divisions. The end of the radial member 20, by its furcations 23, is connected to means slidably engaging the curved edge 12 of the quadrant so as to permit the radial member 20 to be accurately and carefully angularly positioned. As best shown in Fig. 2, the edge of the quadrant may be provided with a downwardly extending lip and a carriage 40 may be provided, such carriage grasping the downwardly extending flange as indicated at 41 and being connected to the furcations 23 of the member 20 as indicated at 42 whereby smooth, sliding engagement with the edge of the quadrant is maintained.

The carriage 40 may be provided with a flat top including locating pins 43 or such carriage may be otherwise arranged to receive and hold an optical viewing and magnifying assembly 45, the optical axis of such assembly intersecting the longitudinal axis of the radial member 20 which passes through vertical extension of the origin point 11 and the station point 26. Such optical axis is then directed upon the indicia in degrees carried by the quadrant at 19 and clearly visible between the furcations 23. The optical assembly 45 may include a self-contained light source directed upon the inscribed graduations 19 and may also include a reticle whereby the angular position or bearing of the station point 26 may be established to a much greater accuracy than that of the graduations 19.

In many surveying problems the bearing of a point and its distance are known. As indicated hereinabove, the computing device permits the bearing or angle to be established with great accuracy. The distance of such point 26 from the origin 11 may also be determined with great accuracy. The calibrated scale 25 (which is pivotally connected at the station point 26) is carefully calibrated. The upper surface of the radial member 20 (beyond the origin point 11) is provided with a zero stop 27. Slidably mounted upon the radial member 20 beyond said stop 27 is a carriage 40' which may also be provided with registry pins 43' adapted to accurately receive and position a microscope or other optical magnifying and observing device 45', the optical axis of such device being directed upon a scale 28 engraved or otherwise applied to the slide member 25. When the station point 26 is directly over the origin point 11 and the optical device 45' is against its stop 27, as shown in Fig. 2, the optical axis of the device 45' should be directed upon zero on the scale 28 carried by the slide 25. It will thus be noted that zero on the calibrated slide 25 is displaced from the station point 26 a distance which is determined by the position of stop 27. It may be noted that the stop 27 may be adjustable upon the radial member 20 in order to facilitate initial adjustment of the device. By the use of a suitable reticle in the optical device 45' mounted upon the sliding carriage 40', subdivisions of the scale 28 may be readily determined. In the event the scale 28 is marked off in units representing tenths and hundredths of a foot, the present device will permit readings to be obtained to the fourth and fifth decimal place of a foot.

As indicated hereinabove, both the distance and range and direction of a station point can therefore be very accurately laid out. The ordinate and abscissa of such a point can now be determined with similar accuracy by the use of the bi-legged orienting member 30.

Figure 5:
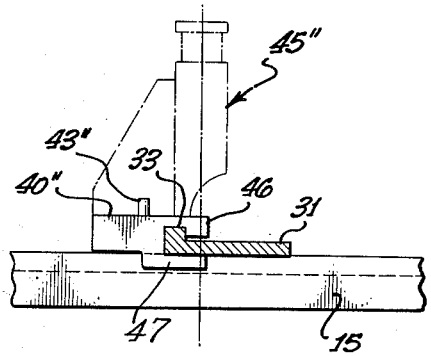
Fig. 5 is a section taken along the plane V—V in Figs. 1 and 4.

As shown in Figs. 4 and 5, the leg 31 may carry the scale 38 adjacent the upstanding stiffening rib 33. Means are provided for slidably engaging the leg 31 of the orienting member 30 and the guide means 15 in all positions of the station point 26 within the quadrant. Such means may comprise the carriage 40" provided with a downwardly extending lip 46 slidably grasping the rib 33 and downwardly extending side wings 47 in sliding engagement with the sides of guide 15 and the lower surface of leg 31 of the orienting member 30. The top of this carriage 40" may also be provided with registry pins 43" for the purpose of permitting a microscope or other optical enlarging and magnifying viewing device 45" to be positioned on the carriage with the optical axis of such device directed upon the zero point of scale 38 when the station point 26 is in vertical alignment with the origin point 11 and zero on the quadrant scale. Since the carriage 40" is arranged to maintain the scale 38 perpendicular to one radial edge of the quadrant at all times, the abscissa or horizontal component of the station point 26 may be accurately determined by a direct reading on the scale 38.

Similarly, the leg 32 is provided with its own scale, means for slidably maintaining the leg 32 of the orienting member at right angles to the guide means 16 and means for accurately reading the scale on such leg, whereby the ordinate may be determined.

It will be evident that the device of the present invention permits direct visual determination of ordinates and abscissa as well as radial distances for any given angle. Whenever an angle and one side of a right triangle are given, all of the characteristics of the resulting right angles may be determined. Similarly, in obtuse or oblique triangles, whenever three parts are known (either two sides and an angle or two angles and a side) the three unknown parts may be quickly determined, as will be evident from the following examples.

Figure 8:
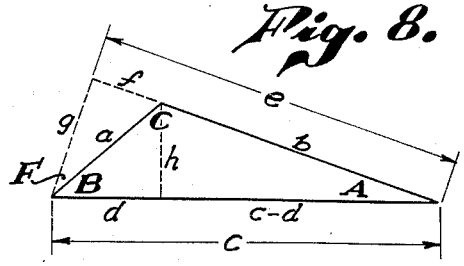
Fig. 8 is a diagram illustrating an exemplary triangle whose characteristics may be determined by the use of the instrument.

Referring to Fig. 8, wherein angles are indicated by capital letters and opposite sides by lower case letters, when sides "$a$" and "$c$" and angle "$B$" is given (1) Distance "$a$" is set on calibrated sliding member 25.
(2) The radial member 20 is adjusted to angle "$B$".
(3) Distances "$h$" and "$d$" are read on scale 38.
(4) With "$h$" remaining set, release the angle and set scale 38 on leg 31 to distance ("$c$"−"$d$").
(5) Now read angle "$A$" and side "$b$" (directly on sliding member 25).
(6) Angle "$C$" is $180° − ("A"+"B")$.

When two sides and an angle opposite one of them is given ("$a$" and "$c$" and angle "$A$"):

(1) Set distance "$c$" on sliding member 25.
(2) Set radial member 20 for angle "$A$" and read distances "$g$" and "$e$."
(3) With distance "$g$" remaining set, release the angle and set for distance "$a$." This permits one to read distance "$f$" and angle "$F$."
(4) Side "$b$" is "$e$"−"$f$."
Angle "$B$" = $90° − ("F"+"A")$.
Angle "$C$" = $180° − ("A"+"B")$.

When angles "$B$" and "$A$" and side "$a$" are known, "$h$" and "$d$" are first determined, and by using "$h$" and angle "$A$," side "$b$" and distance "$e$" are read.

Figure 7:
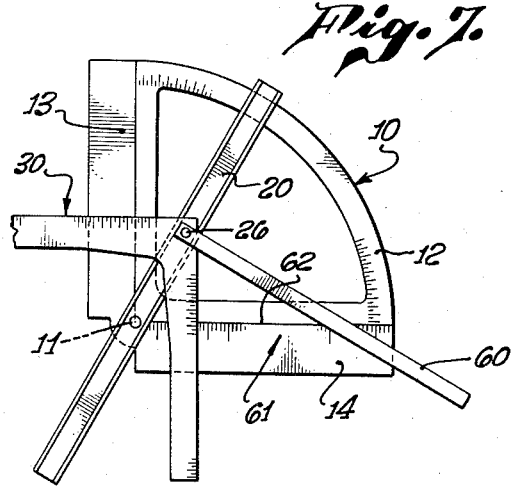
Fig. 7 is a plan view of a modified device.

When three sides, "$a$," "$b$," "$c$" are given, the device is equipped with an extra calibrated scale illustrated in Fig. 7. This additional scale member 60 is pivotally connected to the range or station pivot point 26 and in addition a graduated scale 61 is provided along line 62 which intersects the origin point 11. The three known sides of the triangle are set upon sliding member 25, scale member 60 and scale 61, whereupon the angle between two of the sides is immediately obtained. Further procedure follows that of the second example given hereinabove. It is to be understood that the two legged orienting member may be removable, if desired, to facilitate attachment of member 60 to the station point 26.

The entire device may be made from properly molded or formed members of light metal or, preferably, from a transparent rigid, plastic or synthetic resin such as an acrylic polymer or a cellulose derivative. The quadrant may be cut out, as indicated by margin 18, in order to reduce weight. The quadrant may be provided with downwardly extending feet or supports 29 to properly support it on a table or other working surface.

Figure 6:
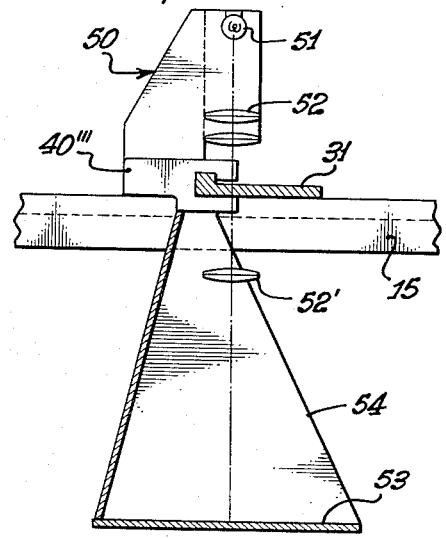
Fig. 6 is a side elevation of a modified form of optical magnifying means.

It is to be understood that the various optical devices such as the microscope 45 may be permanently mounted upon their carriages. Instead of employing microscopes, the carriages may include a projector, each of the projectors projecting the particular scale or indicia upon a screen, in enlarged form, whereby sub-divisions incapable of being defined by the unaided eye can be readily ascertained from the projected image. An exemplary form of such projector is illustrated in Fig. 6, wherein the carriage 40''' is shown provided with a projector 50 having a light source 51 and a suitable lens system 52 adapted to project the graduations carried by leg 31 upon an enlarged screen or table 53 depending from carriage 40''' by legs 54. An auxiliary lens 52' may be used between the leg 31 and table 53.

We claim:

1. A graphic, visually observable computer comprising: a quadrant member provided with an origin point and carrying indicia in degrees adjacent a curved edge; an ordinate guide means and an abscissa guide means at right angles to each other carried by the quadrant; a primary radial member pivotally connected to the origin point of the quadrant; calibrated slide means carried by the radial member and movable longitudinally thereof, said slide means including a station point; a two-legged unitary orienting member provided with an abscissa scale and an ordinate scale, respectively, on said legs, said orienting member being pivotally connected to the calibrated slide at said station point; means interconnecting a leg of said orienting member with a guide means to maintain said leg at right angles to the guide means and a carriage carried by the end of the radial member and slidably engaging the curved edge of the quadrant, said carriage including a light source and a lens system and projection screen means, whereby the quadrant scale may be projected for visual and accurate observation.

2. A graphic, visually observable computer comprising: a quadrant member provided with an origin point and carrying indicia in degrees adjacent a curved edge; an ordinate guide means and an abscissa guide means at right angles to each other carried by the quadrant; a primary radial member pivotally connected to the origin point of the quadrant and including calibrated slide means carried thereby and movable longitudinally thereof, said slide means including a station point; a unitary orienting member provided with legs at right angles, one of said legs carrying an abscissa scale and the other leg an ordinate scale, said orienting member being pivotally connected to the calibrated slide at said station point; and a carriage in movable engagement with a leg of the orienting member and one of said guide means at all positions of the primary radial member and leg, said carriage including means for maintaining said leg at right angles to said guide means and also including a light source and a lens system and projection screen means whereby the position of the leg of the orienting member with respect to the guide means may be projected for visual enlargement and accurate observation.

References Cited in the file of this patent

UNITED STATES PATENTS

| | | |
|---|---|---|
| 318,578 | Patterson | May 26, 1885 |
| 537,782 | Lacoste | Apr. 16, 1895 |
| 754,086 | Nichols | Mar. 8, 1904 |
| 1,262,023 | Crampton | Apr. 9, 1918 |
| 1,357,731 | Schaper | Nov. 2, 1920 |
| 2,300,401 | Basler et al. | Nov. 3, 1941 |
| 2,552,460 | Rodman | May 8, 1951 |

OTHER REFERENCES

Article American Machinist, August 30, 1945 (publ.).